July 21, 1953  H. MENDELSON  2,645,943
ADJUSTABLE DRIVE CORD TENSION DEVICE
Filed Jan. 19, 1951  2 Sheets-Sheet 1
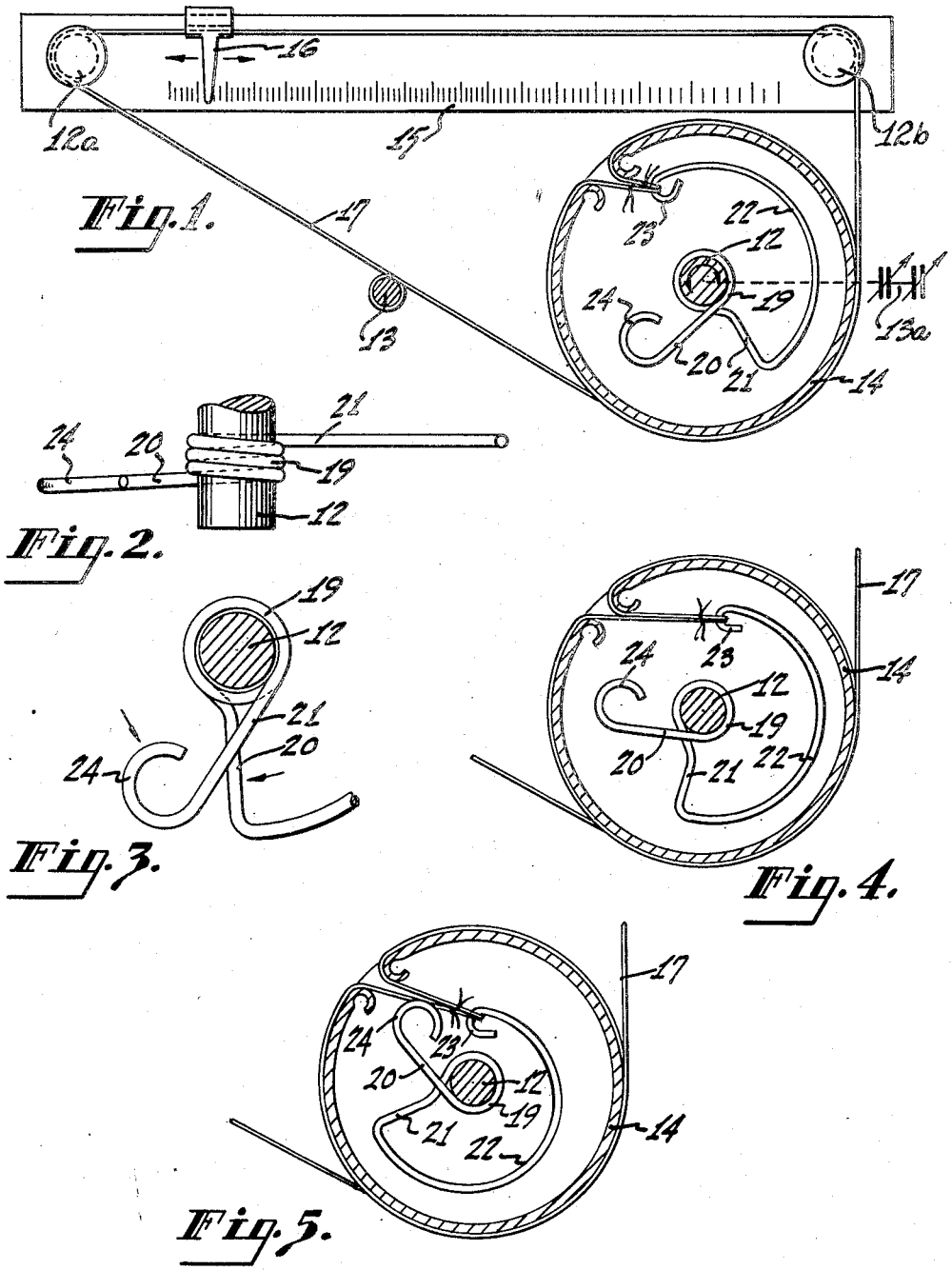
INVENTOR
HANS MENDELSON
BY
ATTORNEY July 21, 1953     H. MENDELSON     2,645,943
ADJUSTABLE DRIVE CORD TENSION DEVICE
Filed Jan. 19, 1951     2 Sheets-Sheet 2

INVENTOR
HANS MENDELSON
BY
ATTORNEY

Patented July 21, 1953

2,645,943

UNITED STATES PATENT OFFICE 2,645,943

ADJUSTABLE DRIVE CORD TENSION DEVICE

Hans Mendelson, Camden, N. J., assignor to Radio Corporation of America, a corporation of Delaware Application January 19, 1951, Serial No. 206,753

12 Claims. (Cl. 74—10.7)

The present invention relates to tension means for radio tuning control drive cords and the like. More particularly, the present invention relates to a drive cord spring tension device for cord drive systems of the type which is readily attachable to radio tuning control shafts, such as the shafts of standard variable tuning capacitors to provide easy adjustment of cord tension and slack take-up for cord or belt driven shafts and indicators and the like.

Flexible cord or belt drives are commonly used in control systems for actuating variable capacitors or other tuning elements generally with speed reduction between a control knob and said elements, and for coordination of station or frequency indicators on radio receivers. Rather close control and maintenance of the proper cord tension and slack take-up is needed to provide proper operation of the flexible drive. Too little tension results in cord slippage on the drive elements and improper operation or even errors in tuning. Too much tension results in premature wear of the drive cord. Moreover, the optimum tension is determined not only by the coefficient of friction of the drive cord material with respect to the pulleys or shafts about which they are wrapped, but also by the total accumulated friction of the entire drive mechanism. As the total friction varies from one piece of equipment to the other, tension requirements are quite different in different drive designs.

The most commonly used method for providing cord tension is the use of a standard helical extension spring. One end of the helical spring is attached to one or both ends of the cord and the other end of the spring is hooked into a hole or lance provided on a drive pulley which is mounted on the shaft of a variable capacitor or other tuning element. The cord tension is controlled solely by the amount of tension exerted by the spring. In any given control system there are two factors which determine the initial spring tension in a given drive design: (1) The predetermined unchangeable characteristic of the spring, and (2) the total length of the drive cord. Practical experience shows that close control of the cord length is difficult and that unavoidable cord slack due to cord elongation under stress causes the helical springs to lose the original full tension. In fact, the spring tension may be reduced to such an extent as to cause the spring to become practically ineffective. Furthermore, space limitations, especially with the standard smaller size tuning shaft drums in radio receivers may leave insufficient space radially for spring extension or adjustment.

The varying cord length resulting from manufacturing variations, and cord elongation due to continued and extended use, gives rise to the necessity for a tension device which is capable of providing a predetermined tension through a wide range of spring deflection despite space limitations.

As there is an optimum value for the cord tension in each drive mechanism, it is desirable to provide a spring having not only a wide deflection range, but also enabling easy adjustment of the spring tension after it is assembled with the drive cord and the tuning or other driven member.

It is, therefore, an object of this invention to provide an improved tension device for drive cord systems which is readily attachable to the radio tuning control shaft of existing standard equipment.

It is further an object of this invention to provide an improved cord tension spring device to enable simple and accurate adjustment of cord tension and slack take-up in cord drive indicator and tuning systems for radio and similar apparatus.

It is an additional object of the invention, to provide a spring tension or slack take-up means for a cord or belt drive tuning system which may provide substantially uniform tension over a wide deflection range and which may readily be attached and easily adjusted initially and at anytime thereafter without disassembly to produce optimum or any desired degree of cord or belt tension.

It is yet another object of the invention to provide a tension device which may be employed in various standard cord drive assemblies for radio receivers and the like and which is of an improved construction adapted to be manufactured at low cost.

A better understanding of the invention together with additional objects and advantages thereof, may be had by reference to the following description when considered in connection with the accompanying drawings and the invention is further defined in the appended claims.

In the drawings:

Figure 1 is a front elevation view, partly in section, of a cord drive mechanism for the standard type radio receiver employing a preferred embodiment of the invention;

Figure 2 is a fragmentary plan view of the tensioning device of Figure 1 showing a constructional detail;

Figure 3 is a fragmentary front view of the tension device of Figure 1, showing how the same may be adjusted;

Figure 4 is a front elevation view, partly in section, of the tension device of Figure 1, positioned to maintain tension with increased cord length;

Figure 5 is a front elevation view, partly in section, of the tension device of Figure 1, positioned to provide increased tension over that provided by the position shown in Figure 4;

Figures 6, 7:
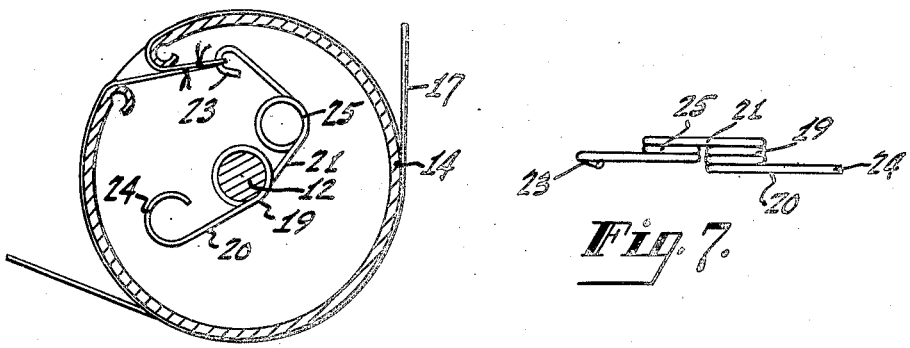
Figure 6 is a front elevation view, partly in section, of a further embodiment of the invention illustrating a modification of the form shown in Figures 1 to 5 inclusive.
Figure 7 is a fragmentary plan view of the embodiment illustrated in Figure 6 showing a detail of construction.

Referring to the drawings, in which like reference characters are used to designate like parts throughout various figures, and with particular reference to Figure 1, a cord drive indicator system for a radio tuning control is shown by way of example comprising a large pulley or drum 14, and two offset idler pulleys 12a and 12b, respectively, and a drive or tuning shaft 13 connected by a flexible drive means or wrapped cord 17. A pointer 16 is attached to an intermediate position or reach of the cord extending between the two idler pulleys whereby the pointer is moved or carried in a straight line across a graduated tuning scale 15. The tuning shaft 13 engages one or more loops of the cord 17 to impart a driving force to the other tuning elements when the shaft 13 is rotated.

Each end of the cord is led into an opening or slot provided in the periphery of the drum 14. This drum is mounted on a main tuning shaft 12, and fixed thereto in any suitable manner, of a variable tuning capacitor 13a. A tensioning device 22 is frictionally and adjustably mounted on an extended portion of the same shaft. The tensioning device 22 is fabricated of spring metal, preferably in wire form, and is partly in the form, as shown in Figures 1 and 2, of a helix through which the shaft 12 passes. A free end 20 extends in a generally tangential direction from the helix being extended beyond the tangential portion 20 and bent into a curved portion 24. The other free end of the helix being longer and extended in a curvilinear form or whip-end adapted to conform under tension approximately to the curvature of the drum 14 or being provided with a hook 23 at the extreme end for engaging a looped end or ends of the cord 17.

The center helical portion 19 of the tension device is wound tightly enough to anchor the tension device by gripping the shaft 12, and which provides tension on the cord 17 through the arm portion 21 and arcuate body element or long end portion 22. The flexible arcuate portion or end 22 allows the cord tension to be varied over a wide range regardless of the size of the drum employed.

Figure 3 illustrates how the tensioning device of Figure 1 is assembled with the indicator system and how its position on the driven shaft 12 may be rotated. In the present example, the inside diameter of the helix 19 in relieved position is slightly smaller than the standard shaft diameter of the common variable capacitor. By pinching together or compressing the straight or radial arm portions 20 and 21 extending from the helix 19 with thumb and forefinger of one hand, as indicated by the arrows in Figure 3, the inside diameter of the helix is enlarged sufficiently to allow the helix to be slipped over shaft 12. It is, of course, understood that the internal diameter of the helix 19 enlarges with applied pressure and that the straight portions are shown in a crossed position only to facilitate the application of such force. After the helix 19 is slipped over the shaft 12, it securely and automatically engages the shaft 12 as soon as the finger pressure is released. The finger grip 24 facilitates compression of straight members 20 and 21. Adjustment of cord tension for any cord length is therefore easily accomplished by rotating the position of the tension device on shaft 12 by merely pressing together members 20 and 21 and rotating the tension device clockwise on the shaft, as viewed in the drawings.

The operation of the tension device can be seen best by reference to Figures 4 and 5 in conjunction with Figure 1. Figure 1 shows the position the tension device takes upon assembly of the cord drive mechanism. Proper tension on the cord 17 is obtained by compressing straight members 20 and 21 rotating the tension device in the clockwise direction above mentioned. Should the cord 17 become slack, as experience has shown is the case due to elongation of the cord under stress, proper tension is again obtained by rotating the tension device further in a clockwise direction. The corrected position of the tension device is shown in Figure 4. Figure 5 shows the position of the tension device when tension on the cord is further increased as may be required in some cases. As shown in Figures 1, 4 and 5, regardless of the cord length variation, the cord tension can easily be adjusted over a wide range by rotating the tension device around the shaft. Clockwise rotations increases the tension while counterclockwise rotation decreases the tension.

The design of the tension device is such that with increasing cord tension, the locking torque of the tension device on shaft 12 is also increased resulting in a safe anchoring under all conditions. Figures 1, 4 and 5 also illustrate the manner in which the flexible arcuate element 22 permits a large variation of tension to be applied to the cord 17 by moving in a limited space without interference with the drum 14 or the shaft 12.

The tensioning device illustrated by Figures 6 and 7 is substantially the same as that illustrated in Figures 1 to 5 inclusive, except that the elongated end of the helix having a hook on the end thereof is provided with a second or intermediate helical spring portion in order to insure maximum resiliency in shorter space for use in driving drums or pulleys of relatively small diameter. In this embodiment, the resilient arcuate portion 22 of the tension device shown in Figures 1 to 5 is replaced by a second helix 25. The necessary deflection therefore is achieved almost entirely in the second helix 25.

Figures 8, 9:
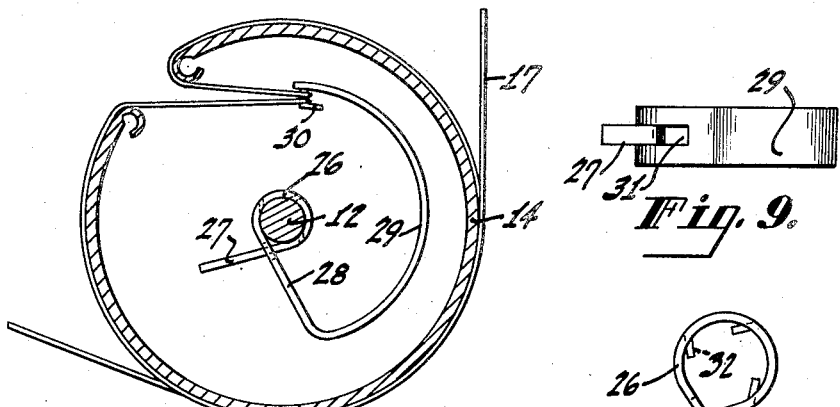
Figure 8 is a front elevation view, partly in section, of a third embodiment of the invention; being a further modification of the embodiment shown in Figures 1 to 5 inclusive.
Figure 9 is a plan view of the device shown in Figure 8.

A third embodiment of the invention illustrating the use of strip spring metal rather than wire as a fabricating material is shown in Figures 8 and 9. The tension device has a loop portion 26, straight members 27 and 28, flexible element 29, and a cord securing hook 30. The loop 26, engages the outer periphery of the shaft 12 and may be disengaged from the shaft by pressing together the straight members 27 and 28. As shown in Figure 9, the straight member 27 passes through a slit 31 in the straight member 28 to complete the loop 26.

Figure 10:
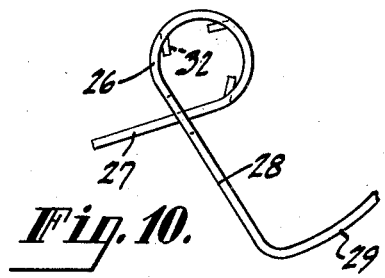
Figure 10 is a fragmentary front view of the device shown in Figure 8.

Figure 10 shows the additional feature of a plurality of burrs 32 which may be made to form part of loop 26, being integral projections struck inwardly from the loop as indicated. The burrs 32 provide increased friction enabling the loop 26 to be anchored more securely to shaft 12 where necessary.

Figure 11:
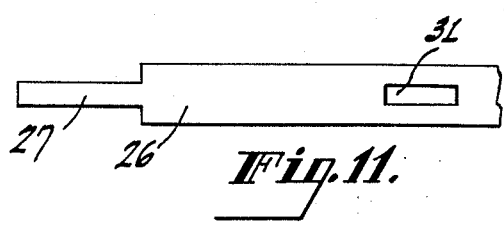
Figure 11 is a fragmentary plan view of the device shown in Figure 8 in developed flat strip form.

Figure 11 illustrates a partial stamping of sheet stock from which the loop portion 26 is formed. The straight member 27 is bent around and passed through the slit 31 to form the loop 26.

From the foregoing description it will be seen that the invention provides improved means for meeting the problem of cord drive adjustment in both new and existing radio tuning systems, since the invention provides replacement means for the old-type troublesome coil tension-spring tightener means, and has none of the disadvantages of the former means. In addition, commercial embodiment of the invention in the presently preferred form shown may be manufactured, installed and adjusted at relatively low cost.

What is claimed is:

1. In a position control and indicator system for radio receivers and the like, the combination of a shaft, a pulley element fixedly mounted on said shaft, a pulley drive cord wound around said pulley, and a manually releasable resilient cord tensioning device frictionally gripping said shaft to provide instant rotational adjustability of said device, the said device being provided with pulley drive cord engaging means for preventing cord slack and maintaining a predetermined and adjustable tension thereon.

2. In a position control and indicator system for radio receivers and the like, the combination of a shaft, a pulley fixedly mounted on said shaft, a flexible cord element wound around said pulley, and a resilient cord tensioning device having a center helical portion frictionally gripping said shaft and having ends extending therefrom in the form of substantially radial members, said radial members being adapted when pressed toward each other to provide a force against said helical portion whereby the diameter of said helical portion is enlarged, one of said members further extending to form a flexible arcuate spring element and means at the free end of said last named element adapted to engage said flexible drive cord element, whereby tension may be maintained on said cord element to cause effective gripping of said pulley at all times.

3. As an article of manufacture, a tension device for radio cord driven tuning systems comprising a tuning control shaft, a pulley fixed to said shaft, and a flexible drive cord element wound around said pulley, said tension device comprising a spring wire element having center helical spring portion adapted to frictionally engage said tuning control shaft and having substantially radially extending ends forming straight members adapted to be pressed thereby to expand the diameter of said center portion about said shaft for adjustment thereof by movement about said shaft, one of said straight members extending in the form of a flexible arcuate spring element and means integral with the free end of said last named element adapted to engage said flexible drive cord element, whereby tension may be maintained on said cord element to cause effective gripping of said pulley.

4. A tension device for a cord driven radio tuning control system or the like wherein a drive cord is wound around a pulley, comprising a unitary spring wire element having a helical spring portion and a pair of integral arm members extending tangentially therefrom in relatively close proximity one with respect to the other, an arcuate spring portion in integral extension of one of said straight arm members, providing a flexible whip end therefor, and means providing a hook at the free end of said spring portion adapted to engage and apply tension to the drive cord of said system.

5. A tension device as defined by claim 4, in which the entire tension device comprises a single wire of uniform diameter.

6. In a position control and indicator system, the combination of a shaft, a flanged pulley fixedly mounted on said shaft, a flexible cord element wound around said pulley, and a resilient cord tensioning device having a center helical portion frictionally gripping said shaft and having ends extending therefrom in the form of compressible members, one of said members further extending to form a second helical portion, and means at the free end of said last named element adapted to engage said flexible drive cord element for said pulley, whereby tension may be maintained on said cord element to cause effective gripping of said pulley.

7. As an article of manufacture, a tension device for a radio tuning indicator system of the type having a shaft, a pulley fixed to said shaft, and a flexible drive cord element wound around said pulley, said tension device comprising, a center helical spring portion comprising a plurality of turns adapted to frictionally engage a rotary control shaft for radio apparatus and the like and having ends, adapted to be pressed one toward the other, thereby expanding the diameter of said center portion for engaging and disengaging said shaft, one of said members being extended to provide a curled finger grip and the other of said members being extended to provide a second helical spring portion, means at the free end of said last named helical spring portion adapted to engage said flexible drive cord element around said pulley, whereby tension may be applied thereby and maintained on said cord element to provide effective gripping of said pulley at all times in use.

8. A tension device for cord driven cord systems comprising a unitary spring wire element having a first helical spring portion and a pair of arm members extending tangentially therefrom in relatively close proximity one with respect to the other, and a second helical spring portion being an integral extension of one of said straight arm members providing a hook at the free end of said second helical spring portion.

9. In a position control and indicator for a radio tuning drive system, the combination of a shaft, a pulley fixedly mounted on said shaft, a flexible drive cord element wound around said pulley and a resilient cord tensioning device within the confines of the pulley flange having a center loop portion frictionally gripping said shaft and short end portions extending therefrom generally radially with respect to the shaft, one of said end portions being formed with a slit and the other of said end portions passing through said slit in said one end portion of the loop, said one end portion having a flexible arcuate extension integral therewith and provided with means to engage said flexible drive cord whereby tension may be maintained on the same in said tuning drive system.

10. As a new article of manufacture, a tension device for radio tuning control apparatus having a rotary control shaft, a pulley fixed to said shaft, and a flexible tuning drive cord wound around said pulley, said device comprising a single spring wire of substantially uniform diameter having a center loop portion comprising at least one helical turn with an internal diameter less than the diameter of the control shaft, whereby it is adapted frictionally to engage said shaft and having substantially radially extending ends forming compressible arm members adapted to be pressed together thereby to expand the diameter of said loop portion when engaging said shaft and to permit rotational adjustment of said device on the shaft, one of said arm members being extended to provide a finger grip and the other of said arm members having an integral elongated flexible arcuate end portion adapted at the free end thereof to engage said flexible tuning drive cord, to provide constant tension thereon to any desired degree.

11. A tension device for a radio tuning drive cord comprising a piece of spring wire having a center loop portion of a plurality of turns adapted to engage and grip a rotary control shaft and having a pair of arm members extending tangentially therefrom, and a flexible arcuate element connected at an end to one of said arm members and provided with means to engage said tuning drive cord, whereby tension may be maintained on the same.

12. A tension device for taking up slack in a flexible drive cord in a radio tuning control system of the type comprising a rotatable shaft, a pulley fixed to said shaft, and said drive cord wound around said pulley, said tension device comprising a single, elongated piece of spring material having a loop portion adapted to frictionally engage said shaft, a pair of arms extending tangentially from said loop portion, an arcuate element extending from one of said arms, and a hook portion at the end of said arcuate element adapted to engage said drive cord, the internal diameter of said loop portion being slightly smaller than the diameter of said shaft and adapted to increase upon pressing said arms together.

HANS MENDELSON.

References Cited in the file of this patent

UNITED STATES PATENTS

| Number | Name | Date |
|---|---|---|
| 1,674,009 | Holmes | June 19, 1928 |
| 1,925,945 | Zielinski et al. | Sept. 5, 1933 |
| 1,939,856 | Langley | Dec. 19, 1933 |